United States Patent
Sato

(10) Patent No.: US 11,335,134 B2
(45) Date of Patent: May 17, 2022

(54) DRIVING EVALUATION SYSTEM AND STORAGE MEDIUM

(71) Applicant: HONDA MOTOR CO., LTD., Tokyo (JP)

(72) Inventor: Masayuki Sato, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 512 days.

(21) Appl. No.: 16/245,296

(22) Filed: Jan. 11, 2019

(65) Prior Publication Data

US 2019/0221053 A1 Jul. 18, 2019

(30) Foreign Application Priority Data

Jan. 18, 2018 (JP) .............................. JP2018-006331

(51) Int. Cl.
*G07C 5/02* (2006.01)
*G07C 5/08* (2006.01)
(Continued)

(52) U.S. Cl.
CPC ............ *G07C 5/02* (2013.01); *B62D 15/0265* (2013.01); *G06Q 10/06398* (2013.01);
(Continued)

(58) Field of Classification Search
CPC ...... G07C 5/02; G07C 5/0825; G07C 5/0866; B62D 15/0265; G06Q 50/30; G06Q 10/06398; B60W 40/08; B60W 50/00
See application file for complete search history.

(56) References Cited

U.S. PATENT DOCUMENTS

| 2012/0098678 A1 | 4/2012 | Rathmacher et al. |
| 2018/0107883 A1* | 4/2018 | Viswanath ......... G06K 9/00805 |
| 2018/0141588 A1 | 5/2018 | Shimizu |

FOREIGN PATENT DOCUMENTS

| CN | 101870293 | 10/2010 |
| CN | 103155012 | 6/2013 |

(Continued)

OTHER PUBLICATIONS

English translation of JP 2015191260 A (IDS reference) (Year: 2015).*

(Continued)

*Primary Examiner* — James J Lee
*Assistant Examiner* — Shon G Foley
(74) *Attorney, Agent, or Firm* — Amin, Turocy & Watson, LLP

(57) ABSTRACT

A driving evaluation system includes an approach determiner configured to determine whether a degree of approach between an object present in a periphery of a vehicle and the vehicle is a predetermined degree or more, a relative position acquirer configured to acquire a relative position of the vehicle with respect to a traveling lane along which the vehicle travels, and an evaluator configured to refer to the relative position acquired by the relative position acquirer and thereby evaluate a driver's skill in driving the vehicle as higher as the vehicle travels at a position closer to a center of the traveling lane, the evaluator excluding an interval in which it is determined by the approach determiner that the degree of approach is a predetermined degree or more from a target for evaluation.

14 Claims, 12 Drawing Sheets

(51) Int. Cl.
*B62D 15/02* (2006.01)
*G06Q 50/30* (2012.01)
*G06Q 10/06* (2012.01)

(52) U.S. Cl.
CPC .......... *G06Q 50/30* (2013.01); *G07C 5/0825* (2013.01); *G07C 5/0866* (2013.01)

(56) References Cited

FOREIGN PATENT DOCUMENTS

| | | |
|---|---|---|
| JP | 2009-126503 | 6/2009 |
| JP | 2011034138 A * | 2/2011 |
| JP | 2014-139756 | 7/2014 |
| JP | 5587465 | 9/2014 |
| JP | 2015-191260 | 11/2015 |
| JP | 2016-151864 | 8/2016 |
| WO | 2017/022534 | 2/2017 |
| WO | 2017022474 | 2/2017 |
| WO | 2017/154460 | 9/2017 |

OTHER PUBLICATIONS

Japanese Office Action for Japanese Patent Application No. 2018-006331 dated Aug. 20, 2019.
Japanese Notice of Allowance for Japanese Patent Application No. 2018-006331 dated Oct. 8, 2019.
Chinese Office Action for Chinese Patent Application No. 20190030148.2 dated Oct. 9, 2021.

* cited by examiner

FIG. 2

|  | POSITION |
|---|---|
| OBJECT | (X, Y) |
| ⋮ | ⋮ |
| LEFT LANE | (X, Y) ··· |
| RIGHT LANE | (X, Y) ··· |
| ⋮ | ⋮ |

|  | SPEED/ ACCELERATION |
|---|---|
| HOST VEHICLE | / |
| OBJECT | / |

| | |
|---|---|
| DISTANCE BETWEEN HOST VEHICLE AND OBJECT | ** |
| DISTANCE BETWEEN HOST VEHICLE AND ROAD DIVISION LINE | ** |
| DISTANCE BETWEEN OBJECT AND ROAD DIVISION LINE | ** |
| TTP | ** |

FIG. 5A

| TIME | PROCESSING RESULT OF FIRST DETERMINATION PROCESSOR | PROCESSING RESULT OF SECOND DETERMINATION PROCESSOR | Ld/Rd DEGREE OF WOBBLE | |
|---|---|---|---|---|
| T+25 | × | ○ | 5/15 -10 | ⎫ NON-TARGET FOR EVALUATION |
| ⋮ | ⋮ | ⋮ | ⋮ | |
| T+16 | × | ○ | 9/11 -1 | ⎭ |
| ⋮ | ⋮ | ⋮ | ⋮ | ⎫ TARGET FOR EVALUATION |
| T+10 | × | × | 11/9 -1 | ⎭ |
| ⋮ | ⋮ | ⋮ | ⋮ | ⎫ NON-TARGET FOR EVALUATION |
| T+1 | ○ | × | 12/8 -3 | ⎭ |

DRIVING EVALUATION SYSTEM AND STORAGE MEDIUM

CROSS-REFERENCE TO RELATED APPLICATION

Priority is claimed on Japanese Patent Application No. 2018-006331, filed Jan. 18, 2018, the content of which is incorporated herein by reference.

BACKGROUND

Field of the Invention

The present invention relates to a driving evaluation system and a storage medium.

Description of Related Art

A system that performs a safe driving evaluation on the start and acceleration of a vehicle has been disclosed (see, for example, Patent Document 1). In this system, a message praising a driver is output in a case where the evaluation result is preferable, and a message about advice to a driver is output in a case where the evaluation result is not preferable (Japanese Patent No. 5587465, International Publication No. WO2017/022474).

However, in the related art, it may not be possible to perform an evaluation consistent with the realities of traffic conditions.

The present invention was contrived in view of such circumstances, and one object thereof is to provide an evaluation system and a program which make it possible to perform an evaluation consistent with the realities of traffic conditions.

SUMMARY

An evaluation system and a storage medium according to this invention adopt the following configurations.

(1) According to an aspect of an evaluation system of this invention, there is provided a driving evaluation system including: an approach determiner configured to determine whether a degree of approach between an object present in a periphery of a vehicle and the vehicle is a predetermined degree or more; a relative position acquirer configured to acquire a relative position of the vehicle with respect to a traveling lane along which the vehicle travels; and an evaluator configured to refer to the relative position acquired by the relative position acquirer and thereby evaluate a driver's skill in driving the vehicle as higher as the vehicle travels at a position closer to a center of the traveling lane, the evaluator excluding an interval in which it is determined by the approach determiner that the degree of approach is a predetermined degree or more from a target for evaluation.

(2) In the driving evaluation system of the aspect of the above (1), the approach determiner is configured to determine whether a degree of approach between a first object present in the traveling lane along which the vehicle travels and the vehicle in a traveling direction of the vehicle is a first predetermined degree or more, and the evaluator is configured to exclude an interval in which it is determined by the approach determiner that the degree of approach is the first predetermined degree or more from a target for evaluation.

(3) In the driving evaluation system of the aspect of the above (2), the first object is present in the traveling lane, and is one or both of an object of which a speed is lower than a speed of the vehicle by a predetermined speed or more and an object having a predetermined width or less with respect to a width of the traveling lane.

(4) The driving evaluation system of the aspect of the above (2) further includes an object detector configured to detect the first object present in the traveling direction of the vehicle in the traveling lane along which the vehicle travels.

(5) In the driving evaluation system of the aspect of the above (1), the approach determiner is configured to determine whether a degree of approach between a second object present in an adjacent lane adjacent to a lane along which the vehicle travels and the vehicle in a traveling direction of the vehicle is a second predetermined degree or more, and is configured to determine whether a degree of approach between the second object and the traveling lane along which the vehicle travels in a lateral direction is a third predetermined degree or more, and the evaluator is configured to exclude an interval in which it is determined by the approach determiner to be the second predetermined degree or more and the third predetermined degree or more from a target for evaluation.

(6) The driving evaluation system of the aspect of the above (5) further includes an object detector configured to detect the second object present in the adjacent lane.

(7) In the driving evaluation system of the aspect of the above (1), the evaluator is configured to set an interval in which it is determined by the approach determiner that the degree of approach is less than a predetermined degree as a target for evaluation.

(8) In the driving evaluation system of the aspect of the above (1), the approach determiner is configured to determine whether a degree of approach between the object and the vehicle is a predetermined degree or more using an index based on a distance between the object and the vehicle in a traveling direction and a relative speed between the object and the vehicle.

(9) In the driving evaluation system of the aspect of the above (1), the evaluator is an evaluator configured to refer to the relative position acquired by the relative position acquirer in real time and thereby evaluate a driver's skill in driving as higher as the vehicle travels at a position closer to a center of the traveling lane, and interrupt the evaluation in a case where it is determined by the approach determiner that the degree of approach is a predetermined degree or more.

(10) In the driving evaluation system of the aspect of the above (9), the evaluator is configured to resume the evaluation in a case where it is determined by the approach determiner that the degree of approach is less than a predetermined degree.

(11) According to another aspect of this invention, there is provided a non-transitory computer-readable storage medium causing a computer to: determine whether a degree of approach between an object present in a periphery of a vehicle and the vehicle is a predetermined degree or more; acquire a relative position of the vehicle with respect to a traveling lane along which the vehicle travels; refer to the acquired relative position and then execute an evaluation process of evaluating a driver's skill in driving the vehicle as higher as the vehicle travels at a position closer to a center of the traveling lane; and exclude an interval in which it is determined that the degree of approach is a predetermined degree or more from a target for evaluation.

According to the above (1) to (11), it is possible to perform an evaluation consistent with the realities of traffic conditions.

BRIEF DESCRIPTION OF THE DRAWINGS

FIG. 2 is a diagram showing an example of content of data transmitted to a terminal device by a data transmitter.

FIG. 5A is a diagram showing an evaluation process performed by the evaluator.

DETAILED DESCRIPTION OF EMBODIMENTS

Hereinafter, an embodiment of an evaluation system and a storage medium of the present invention will be described with reference to the accompanying drawings.

First Embodiment

Figure 1:
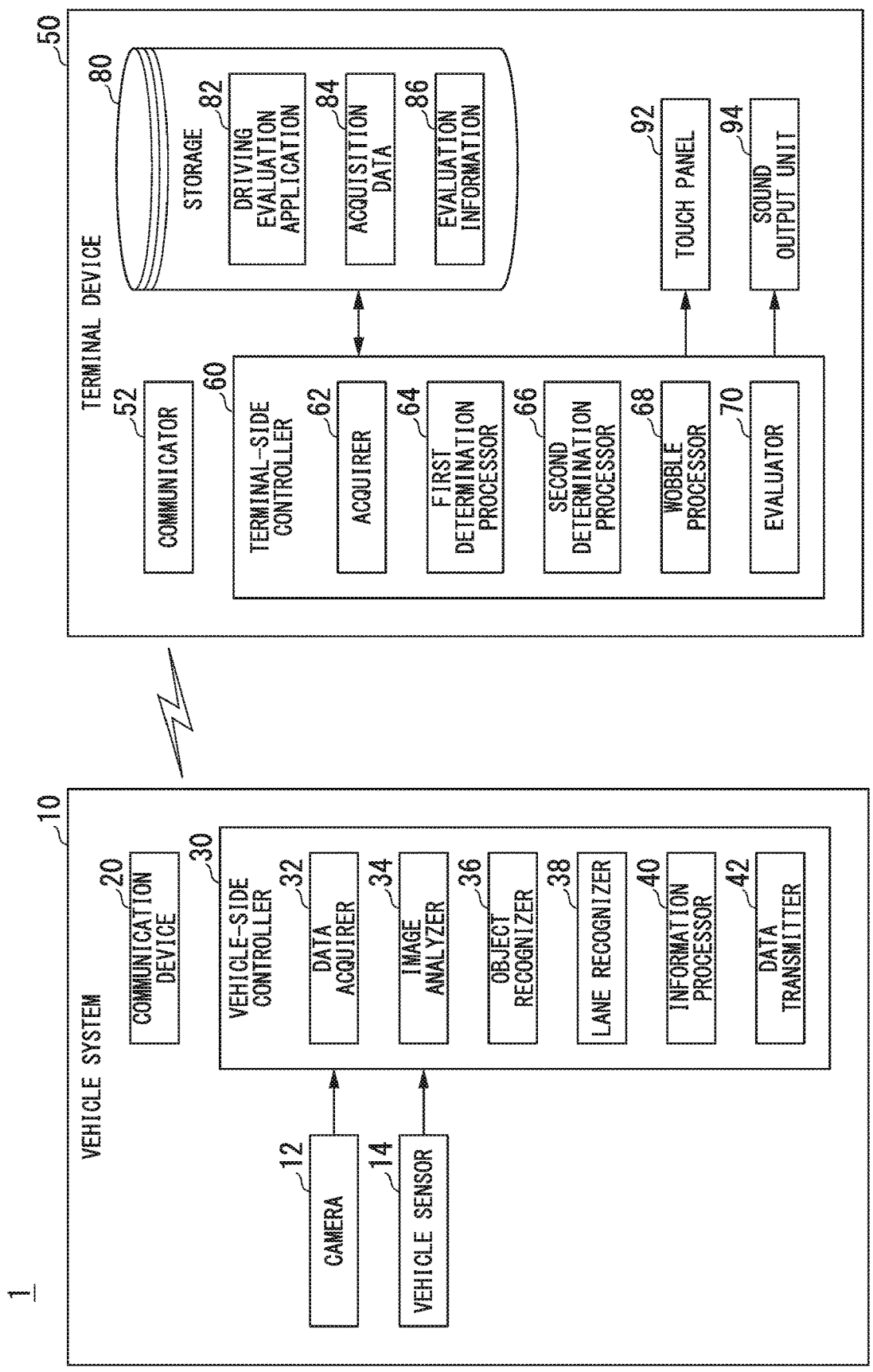
FIG. 1 is a diagram showing an example of a functional configuration of an evaluation system.

FIG. 1 is a diagram showing an example of a functional configuration of an evaluation system 1. The evaluation system 1 includes, for example, a vehicle system 10 and a terminal device 50. The vehicle system 10 and the terminal device 50 communicate with each other using a short-range radio communication standard such as Bluetooth (registered trademark). The vehicle system 10 and the terminal device 50 can communicate with each other by performing, for example, mutual authentication (so-called pairing).

[Vehicle System]

The vehicle system 10 is a system mounted in a vehicle. The vehicle is, for example, a two-wheeled, three-wheeled, or four-wheeled vehicle or the like. The drive source of the vehicle is an internal-combustion engine such as a diesel engine or a gasoline engine, an electric motor, or a combination thereof.

The vehicle system 10 includes, for example, a camera 12, a vehicle sensor 14, a communication device 20, and a vehicle-side controller 30. These devices or instruments, the controller, and the like are connected to each other through a multiplex communication line such as a controller area network (CAN) communication line, a serial communication line, a wireless communication network, or the like. The vehicle system 10 may include an electronic control unit (ECU) or the like that controls each unit of a vehicle, in addition to the above functional configuration. The configuration shown in FIG. 1 is merely an example, and portions of the configuration may be omitted, or still other configurations may be added thereto.

The camera 12 is a digital camera using a solid-state imaging element such as, for example, a charge coupled device (CCD) or a complementary metal oxide semiconductor (CMOS). One or a plurality of cameras 12 are installed at any points of a vehicle (hereinafter, called a host vehicle M) having the vehicle system 10 mounted therein. In a case where a forward image is captured, the camera 12 is installed on the upper portion of the front windshield, the rear surface of the rear-view mirror, or the like. The camera 12, for example, repeatedly captures an image of the periphery of the host vehicle M periodically. The camera 12 may be a stereo camera.

A camera that captures a rearward or sideward image may be installed on the vehicle in addition to the camera that captures the forward image. Further, a radar device, light detection and ranging (LIDAR), or an object recognition device may be mounted in the vehicle in addition to the cameras. The radar device radiates radio waves such as millimeter-waves to the periphery of the host vehicle, and detects radio waves (reflected waves) reflected from an object to detect at least the position (distance and orientation) of the object. The LIDAR irradiates the periphery of the host vehicle with light, measures scattered light according to the irradiation light, and detects a distance to an object on the basis of a time from light emission to light reception. The object recognition device recognizes the position, type, speed, or the like of an object by performing a sensor fusion process on detection results according to some or all of the camera 12, the radar device, and the LIDAR.

The vehicle sensor 14 includes a vehicle speed sensor that detects the speed of the host vehicle M, an acceleration sensor that detects acceleration, a yaw rate sensor that detects angular velocity around a vertical axis, an orientation sensor that detects the direction of the host vehicle M, or the like.

The communication device 20 communicates with the terminal device 50 using, for example, Bluetooth or the like. The communication device 20 may communicate with another vehicle which is present in the periphery of the host vehicle M using, for example, a cellular network, a Wi-Fi network, Bluetooth, dedicated short range communication (DSRC), or the like, or may communicate with various server devices through a wireless base station.

The vehicle-side controller 30 includes, for example, a data acquirer 32, an image analyzer 34, an object recognizer 36, a lane recognizer 38, an information processor 40, and a data transmitter 42. The data acquirer 32 acquires an image captured by the camera 12 and a detection result of the vehicle sensor 14. The image analyzer 34 analyzes the image captured by the camera 12.

The object recognizer 36 detects an object which is present in the periphery of the vehicle and the position of the object on the basis of the analysis result of the image analyzer 34. The position of the object is recognized as, for example, a position in absolute coordinates with a representative point (such as the centroid or the center of a drive shaft) of the host vehicle as an origin. The position of the object may be represented by a representative point such as the centroid or a corner of the object, or may be represented by a represented region.

The lane recognizer 38 recognizes a traveling lane along which the host vehicle travels or an adjacent lane which is adjacent to the traveling lane on the basis of the analysis result of the image analyzer 34.

The information processor 40 recognizes the position of the host vehicle with respect to the traveling lane, the position of an object in the traveling lane, the position of an object with respect to an adjacent lane, and the state of an object on the basis of the recognition result of the object recognizer 36 or the recognition result of the lane recognizer 38. The position of an object is, for example, the position of the object with respect to a lane recognized by the lane recognizer 38. The state of an object is the speed, acceleration, jerk or the like of the object.

Further, the information processor 40 derives a distance (distance in a traveling direction or a lateral direction) between an object and the host vehicle on the basis of the recognition result of the object recognizer 36. The information processor 40 derives a time it will take for the host vehicle M (for example, the front end of the host vehicle M) to catch up with an object (for example, the rear end of the object) or to pass an object (so-called time to pass (TTP)) on the basis of the recognition result of the object recognizer 36 and the detection result of the vehicle sensor 14. The term "pass" means that, for example, the rear end of the host vehicle M in a traveling direction goes past the front end of an object. For example, in the present embodiment, the term "pass" may mean to overtake a vehicle.

The aforementioned TTP is derived on the basis of, for example, the following Expression (1). Here, "Dis" is a distance between the host vehicle M and an object in a traveling direction, "Vm" is the speed of the host vehicle M, and "Vob" is the speed of the object.

$$TTP=Dis/(Vm-Vob) \quad (1)$$

The data transmitter 42 transmits information acquired by the data acquirer 32 and information indicating the processing result of the information processor 40 to the terminal device 50. FIG. 2 is a diagram showing an example of content of data transmitted to the terminal device 50 by the data transmitter 42. Information transmitted from the vehicle system 10 to the terminal device 50 includes, for example, the position of an object, the position of a traveling lane, the position of an adjacent lane, the speed of the host vehicle or the object, the acceleration of the host vehicle or the object, or the like. The information transmitted from the vehicle system 10 to the terminal device 50 is, for example, the distance (distance in a traveling direction or a lateral direction) between the host vehicle and the object, the distance between the host vehicle or the object and the road division line of a traveling lane, the distance between the host vehicle or the object and the road division line of an adjacent lane, the time it will take for the host vehicle M to catch up with the object, to pass the object, or the like.

[Terminal Device]

The terminal device 50 is a terminal device, such as, for example, a smartphone or a tablet terminal, which a crew member can carry. The terminal device 50 includes, for example, a communicator 52, a terminal-side controller 60, a storage 80, a touch panel 92, and a sound output unit 94. The storage 80 is realized by, for example, a read only memory (ROM), a flash memory, an SD card, a random access memory (RAM), a register, or the like. The storage 80 has, for example, a driving evaluation application 82, acquisition data 84, and evaluation information 86 stored therein.

The driving evaluation application 82 is, for example, an application program which is provided by a server under the control of an automobile manufacturer, and is downloaded into the terminal device 50. The driving evaluation application 82 is an application program for evaluating a driver's driving. In a case where a vehicle travels along the center of the lane, this application program puts a higher valuation on driving than in a case where the vehicle does not travel along the center of the lane. However, driving in predetermined traffic conditions is not set as a target for evaluation. The predetermined traffic conditions are traffic conditions unsuitable for evaluating a driver's driving as in a case where a host vehicle and an object approach each other or the like. In this case, this is because it may be appropriate for the host vehicle to travel along a position away from the object rather than the center of the lane. The content of the acquisition data 84 and the evaluation information 86 will be described later.

The communicator 52 communicates with the vehicle system 10 using, for example, Bluetooth or the like. The communication device 20 may communicate with various server devices through a wireless base station using, for example, a cellular network, a Wi-Fi network, Bluetooth, DSRC, or the like.

The terminal-side controller 60 is implemented by the driving evaluation application 82 being executed using a processor such as the central processing unit (CPU) of the terminal device 50. The terminal-side controller 60 includes, for example, an acquirer 62, a first determination processor 64, a second determination processor 66, a wobble processor 68, and an evaluator 70. In a case where the first determination processor 64 and the second determination processor 66 need not be distinguished from each other, they may be called a "determination processor".

The acquirer 62 causes the storage 80 to store information transmitted by the vehicle system 10 as the acquisition data 84 (see FIG. 2 described above).

Figure 3A:
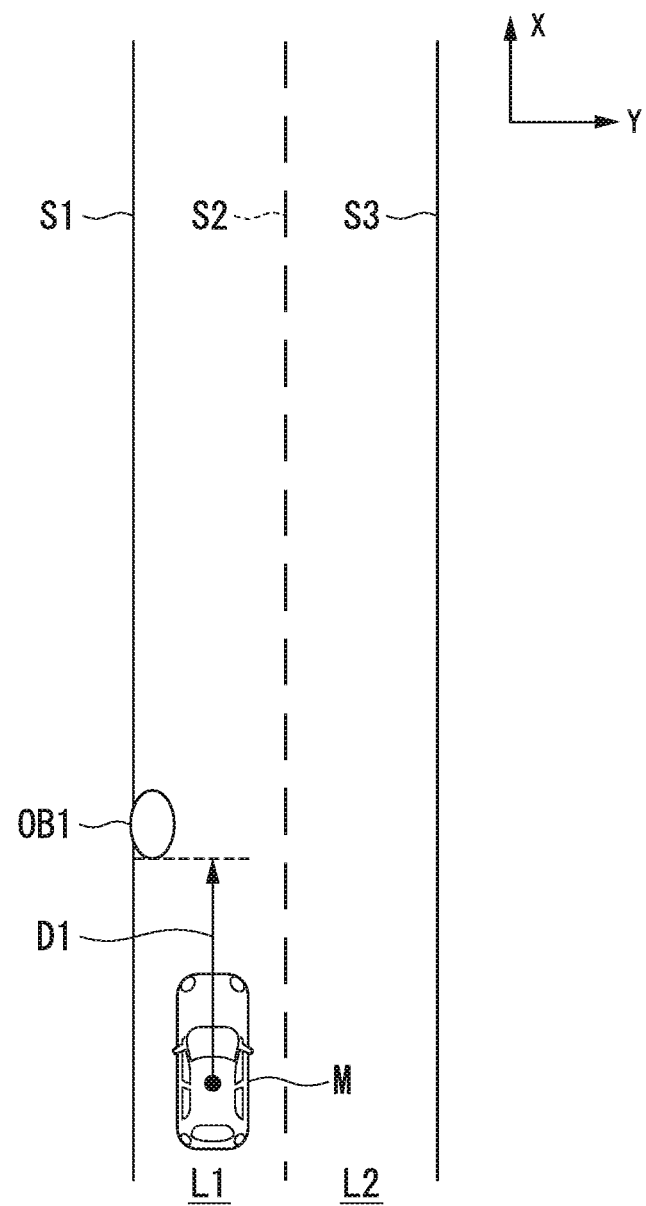
FIG. 3A shows a situation in which a host vehicle travels along a traveling lane.
Figure 3B:
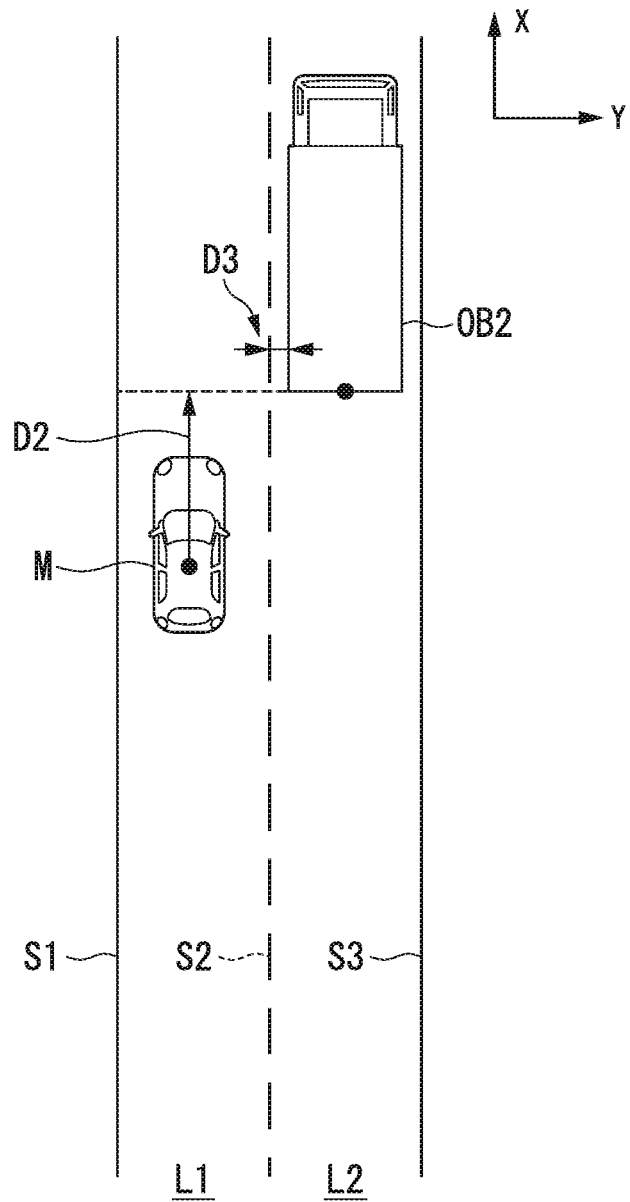
FIG. 3B shows a situation in which the host vehicle travels along the traveling lane.
Figure 3C:
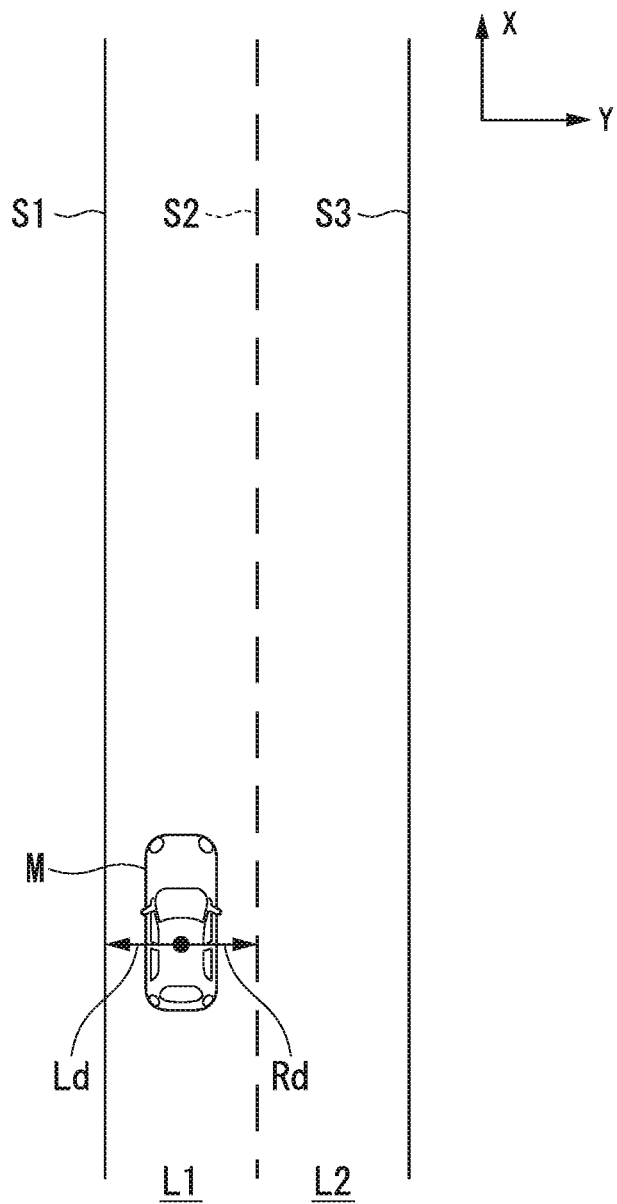
FIG. 3C shows a situation in which the host vehicle travels along the traveling lane.

Reference will be made to FIGS. 3A, 3B, and 3C to describe processes which are performed by the first determination processor 64, the second determination processor 66, and the wobble processor 68. FIGS. 3A, 3B, and 3C show situations in which the host vehicle M travels along a traveling lane L1 (lane divided by road division line S1 and S2). In the following description, the traveling direction of a vehicle is defined as an X direction, and the width direction of the vehicle is defined as a Y direction.

As shown in FIG. 3A, the first determination processor 64 determines whether a first degree of approach between a first object OB1 and the host vehicle M in the traveling direction of the host vehicle is a first predetermined degree or more. The first object OB1 is an object which is present in the traveling direction of the host vehicle M in the traveling lane L1 along which the host vehicle M travels. The first degree of approach is derived on the basis of the TTP or the relative distance between the host vehicle M and an object. In a case where the TTP or the relative distance between the host vehicle M and an object is short, the first degree of approach is large. The wording "the degree of approach is a first predetermined degree or more" means that the host vehicle M approaches an object to a degree equal to or greater than a set threshold.

For example, the first object OB1 is an object different from a vehicle traveling ahead in the traveling lane L1, and an object (object having a relative speed of more than 20 km per hour slower) of which the relative speed to the host vehicle is equal to or higher than a predetermined speed (for example, 20 km per hour), or an object having a predetermined width or less with respect to the width of the traveling lane L1. Examples of the first object OB1 include a vehicle which has stopped across the road division line S1 of the traveling lane L1 or a slow-moving vehicle which has stopped across the road division line S1 of the traveling lane L1, a two-wheeled or three-wheeled motorcycle or a bicycle which is traveling along the traveling lane L1, a pedestrian who is walking along the traveling lane L1, a telephone pole, irregularities on the road surface, other objects (cones for construction), and the like. The first object OB1 may be an object which is present outside of the traveling lane L1, and an object which is present within a predetermined distance from the road division line S1.

The wording "the first degree of approach is a first predetermined degree or more" means that, for example, a distance D1 between a reference position of the first object OB1 and a reference position of the host vehicle M in the traveling direction of the host vehicle M is a predetermined distance or less. The wording "the first degree of approach is a first predetermined degree or more" means that a time it will take for the host vehicle M to catch up with the first object OB1 is within a predetermined time, or the TTP is within a predetermined time. The first determination processor 64 is an example of an "approach determiner".

As shown in FIG. 3B, the second determination processor 66 determines whether a second degree of approach between a second object OB2 and the host vehicle M in the traveling direction of the host vehicle M is a second predetermined degree or more. The second object OB is an object which is present (travels along) in an adjacent lane L2 (lane divided by road division lines S2 and S3) adjacent to a lane along which the host vehicle M travels. The wording "the second degree of approach is a second predetermined degree or more" means that, for example, a distance D2 between a reference position of the second object OB2 and a reference position of the host vehicle M in the traveling direction of the host vehicle M is a predetermined distance or less. The wording "the second degree of approach is a second predetermined degree or more" means that a time it will take for the host vehicle M to catch up with the second object OB2 is within a predetermined time, or the TTP is within a predetermined time. That is, in a case where the TTP or the relative distance between the host vehicle M and an object is short, the second degree of approach is large. The wording "the second degree of approach is a second predetermined degree or more" means that the host vehicle M approaches an object with a degree equal to or greater than a set threshold.

The second object OB2 is a large truck in the example of FIG. 3C, but there is no limitation thereto. For example, the second object OB2 may be an ordinary automobile, a motorcycle, a bicycle, or the like. The adjacent lane may be a lane that allows of traveling in the same direction as that of the traveling lane of a host vehicle, and may be an opposite lane.

The second determination processor 66 determines whether the degree of approach in a lateral direction between the reference position (for example, lateral side) of the second object OB2 and the traveling lane L1 (for example, road division line S2) along which the host vehicle travels is a third predetermined degree or more. The wording "the third degree of approach is a third predetermined degree or more" means that, for example, a distance D3 between the reference position of the second object OB2 and the road division line S2 in the lateral direction of the second object is a predetermined distance or less. That is, in a case where the TTP or the relative distance between the host vehicle M and an object is short, the third degree of approach is large. The wording "the third degree of approach is a third predetermined degree or more" means that the host vehicle M approaches an object with a degree equal to or greater than a set threshold. The second determination processor 66 is another example of the "approach determiner".

The wobble processor 68 derives the position of the host vehicle in the traveling lane as shown in FIG. 3C. The wobble processor 68 derives a distance Ld between the reference position of the host vehicle M and the left road division line S1 and a distance Rd between the reference position of the host vehicle M and the right road division line S2, for example, at predetermined time intervals. The reference position is, for example, is a predetermined position at the center of the host vehicle in a lateral direction.

The evaluator 70 evaluates a driver's skill in driving as higher as the host vehicle travels at a position closer to the center of the traveling lane on the basis of the processing result of the wobble processor 68. The evaluator 70 compares, for example, the lengths of the distance Ld and the distance Rd which are derived at the same timing by the wobble processor 68, and puts a higher valuation on a driver with an increase in the number of times of a small difference (or no difference) between the distance Ld and the distance Rd. The evaluator 70 puts a lower valuation on a driver with an increase in the number of times of a large difference between the distance Ld and the distance Rd.

The evaluator 70 sets an interval in which the first degree of approach is determined to be a first predetermined degree or more by the first determination processor 64 to an interval which is not a target for evaluation. The evaluator 70 sets an interval in which it is determined that the second degree of approach is a second predetermined degree or more by the second determination processor 66 and the third degree of approach is a third predetermined degree or more to an interval which is not a target for evaluation.

Figure 4:
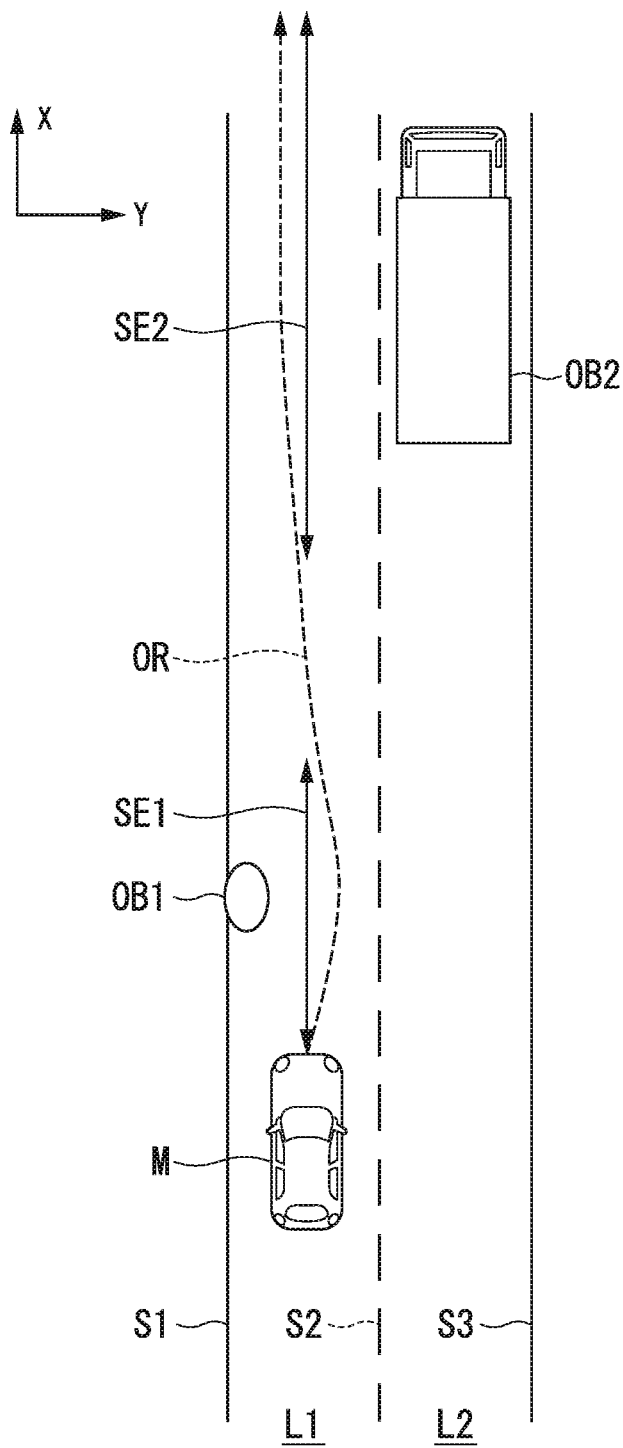
FIG. 4 is a diagram showing an example of an interval which is set to be evaluated and an interval which is set not to be evaluated by an evaluator.

FIG. 4 is a diagram showing an example of an interval which is set to be evaluated and an interval which is set not to be evaluated by the evaluator 70. The same description as that in FIG. 3 will not be given. In the example of FIG. 4, the first object OB1 is present on the left side of the traveling lane L1. The second object OB2 is present in the adjacent lane L2 on the side of the host vehicle M in its traveling direction from the first object OB1. In such a situation, in a case where the host vehicle M travels so as to pass the first object OB1 and the second object OB2 (for example, in a case where the host vehicle travels on a trajectory OR), intervals SE1 and SE2 in which the determination result of the first determination processor 64 or the determination result of the second determination processor 66 is positive are intervals which are set not to be evaluated by the evaluator 70.

For example, this is because it is considered to be driving in which, in the interval SE1, traveling on the right side of the traveling lane L1 is allowed so that the host vehicle M avoids the first object OB1, and it is considered to be driving in which, in the interval SE2, traveling on the left side of the adjacent lane L2 is allowed so that the vehicle avoids the second object OB2.

Figure 5B:
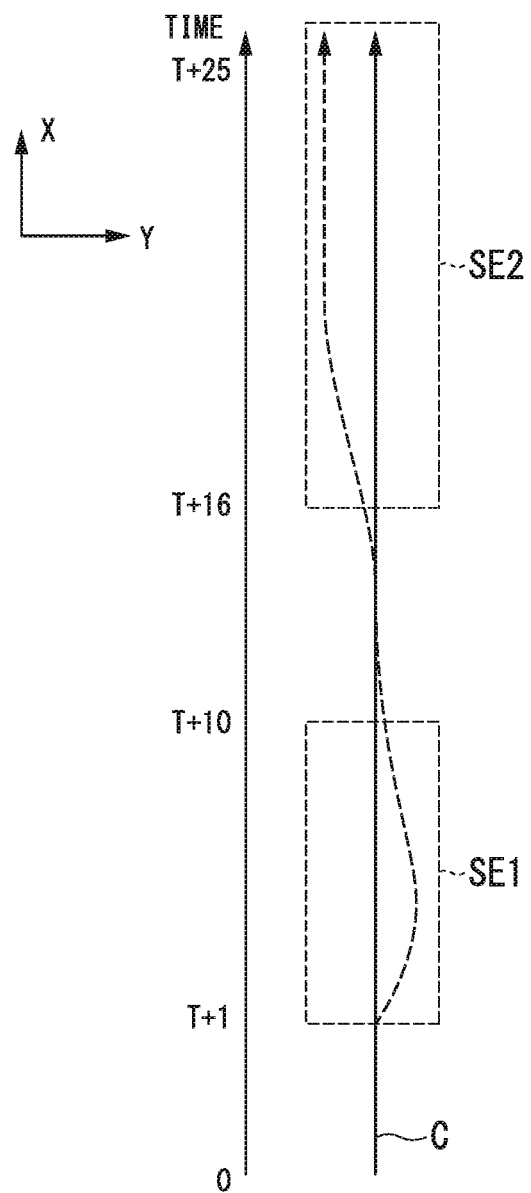
FIG. 5B is a diagram showing the evaluation process performed by the evaluator.

FIGS. 5A and 5B are diagrams showing evaluation processes performed by the evaluator 70. As shown in FIG. 5A, processing results of the determination processor and the wobble processor 68 with respect to the acquisition data 84 acquired for each predetermined time interval are stored in the storage 80. For example, it is assumed that the acquisition data 84 is acquired at time T+1 to T+25. The distances Ld and Rd and the degree of wobble which are a first determination result of the first determination processor 64, a second determination result of the second determination processor 66, and a processing result of the wobble processor 68 are associated with each acquisition data.

In the example of FIG. 5A, "O" is shown in a case where the first determination result or the second determination result is positive, and "x" is shown in a case where it is negative. The degree of wobble is an index indicating the degree of wobble derived by the wobble processor 68 on the basis of the distances Ld and Rd. The wobble processor 68 derives the degree of wobble by applying the distances Ld and Rd (or, information such as speed, acceleration, the type of a road, or the environment of a road (urban district, suburb or the like) in addition to the distances Ld and Rd) to a predetermined function or an algorithm. The degree of wobble may be an index derived on the basis of a yaw rate detected by a vehicle sensor that detects a yaw rate, and may be the degree of wobble to which this the degree of wobble and the degree of wobble derived by a predetermined function or the like are statistically processed.

The evaluator 70 evaluates a driver's driving by setting the degree of wobble at a time (interval) at which the first determination result or the second determination result is positive as a non-target for evaluation, and setting the degree of wobble at a time (interval) at which the first determination result and the second determination result are negative as a target for evaluation. Intervals relevant to a time which is not a target for evaluation are intervals SE1 and SE2 as shown in FIG. 5B. The center of a lane in FIG. 5B is shown by "C". The evaluator 70 statistically processes, for example, the degree of wobble which is a target for evaluation, and derives a score for evaluating a driver's driving.

A process which is executed by the terminal-side controller 60 may be performed in real time, and may be performed after data acquired in real time is accumulated. In a case where a process in real time is performed, a user such as a crew member may be notified of that effect during suspension or resumption using the touch panel 92 or the sound output unit 94.

The touch panel 92 is a device in which a display device and an operating unit that receives an input operation are combined. A score derived by the evaluator 70 is displayed on the touch panel 92.

The sound output unit 94 is, for example, a speaker that outputs a sound. The sound output unit 94 outputs a score derived by the evaluator 70 using a sound.

In the above example, in a case where the determination result of the first determination processor 64 or the second determination processor 66 is positive, the interval is set as a non-target for evaluation. However, in addition to (or instead of) setting as a non-target for evaluation, information for commending a driver for traveling away from an object (for example, information such as the wording "You could drive so as to avoid an object") may be output by the output unit (the touch panel 92 or the sound output unit 94). In a case where the determination result of the first determination processor 64 or the second determination processor 66 is positive, the evaluator 70 may put a high valuation a case of traveling away from an object in the interval. In a case where the determination result of the first determination processor 64 or the second determination processor 66 is positive, the evaluator 70 may put a low valuation on a case of traveling along the center of the traveling lane in the interval.

In the above example, an interval in which the degree of approach to an object is a predetermined degree or more is set to an interval which is not a target for evaluation. However, in addition thereto, in a case where it is appropriate not to travel along the center of the traveling lane in accordance with traffic conditions, the traveling interval may be set to an interval which is not a target for evaluation. Specifically, the term "appropriate" refers to traveling on the outside from the center of a curved road when the host vehicle M travels along a curved road with poor visibility. In this manner, information of an interval which is not a target for evaluation may be stored in, for example, the storage 80 of the terminal device 50, and may be acquired from other devices (for example, vehicle system 10).

The evaluator 70 may output an evaluation at a timing designated by a user. For example, after arrival at a position designated by a user, the evaluator 70 may cause the output unit to output an evaluation result.

The evaluator 70 may perform an evaluation in a plurality of stages. The evaluator 70 performs an evaluation process on the basis of the determination results of the first determination processor 64 and the second determination processor 66, for example, as a primary-stage evaluation. In this case, the evaluator 70 may suspend the process with the evaluation results are recorded as primary data associated with specific conditions such as an interval or a time, and cause the output unit not to output the evaluation results under the setting conditions of a system during ordinary times. The evaluator 70 may output the evaluation results by performing an evaluation on the basis of conditions designated by a user. The wording "conditions designated by a user includes an evaluation of driving in a specific interval, a predetermined time slot, or an interval which is not a target for evaluation, does not include an evaluation of driving in an interval which is not a target for evaluation, or the like.

For example, the evaluator 70 may extract only an evaluation or data in an interval which is not a target for evaluation to output the extracted information as an evaluation result, and may integrate an evaluation in an interval which is not a target for evaluation or an evaluation in a specific interval with another primary-stage evaluation to make an integrated evaluation. Specifically, in a case where an evaluation performed by the evaluator 70 is performed in an interval which is not a target for evaluation, and the host vehicle M travels beyond the center of a lane in order to make a distance from an object in a lateral direction longer than during ordinary times, the evaluator 70 evaluates the traveling to be positive. In a case where the host vehicle M travels beyond the center of a lane in order to make a distance from an object in a lateral direction longer than during ordinary times, the evaluator 70 may consider an evaluation in an interval which is not a target for evaluation more important than an evaluation in a case of traveling along the center of a lane. In this manner, driving in an interval which is not a target for evaluation is evaluated, and in a case where the evaluation is high, a user such as a crew member can also be informed of the commendation effect that the driving is "appropriate". Thereby, evaluation results can be variously used.

[First Flow Chart]

Figure 6:
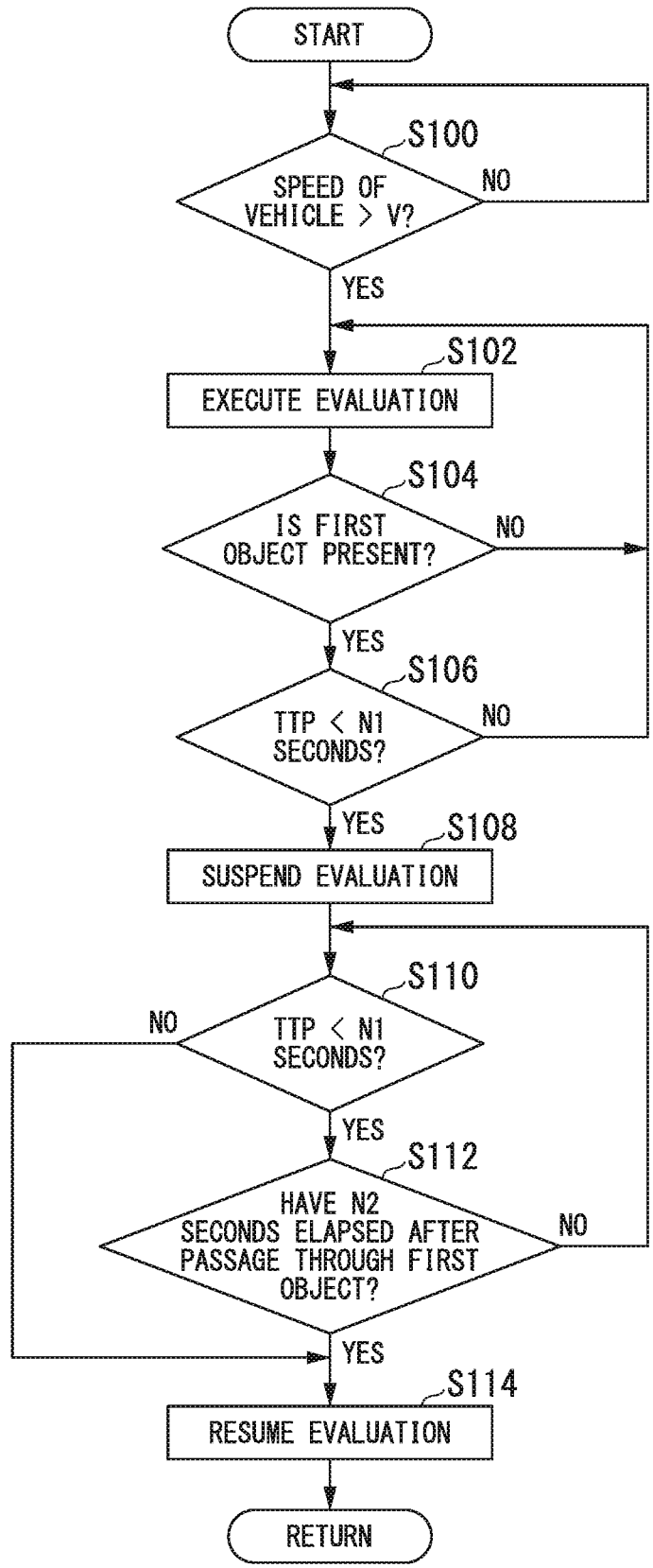
FIG. 6 is a flow chart showing an example of a flow of processes executed centering on a first determination processor.

FIG. 6 is a flow chart showing an example of a flow of processes executed centering on the first determination processor 64. FIG. 6 is a process in which a process executed by the terminal-side controller 60 is performed in real time.

First, the acquirer 62 determines whether the speed of a vehicle exceeds a speed V1 (for example, 20 km) (step S100). In a case where the speed of the vehicle exceeds the speed V1, the terminal-side controller 60 executes an evaluation (step S102). The wording "executing an evaluation" means that the first determination processor 64, the second determination processor 66, the wobble processor 68, and the evaluator 70 execute processes.

Next, the first determination processor 64 determines whether the first object OB1 is present in the traveling lane (step S104). In a case where the object is not present, the flow returns to the process of step S102.

In a case where the object is present, the first determination processor 64 determines whether the TTP is less than N1 seconds (for example, 3 seconds) (step S106). In a case where the TTP is not less than N1 seconds, the flow returns to the process of step S102.

In a case where the TTP is less than N1 seconds, the evaluator 70 suspends an evaluation (step S108). The wording "suspending an evaluation" means that the evaluator 70 excludes an evaluation in an interval in which the TTP is less than N1 seconds among a target for evaluation.

Next, the first determination processor 64 determines whether the TTP is less than N1 seconds (step S110). In a case where the TTP is not less than N1 seconds, the flow proceeds to the process of step S114 described later. For example, in a case where the first object OB1 is an object that moves in the traveling direction of the host vehicle M, and the first object OB1 accelerates, the TTP is once set to be less than N1 seconds, and then the TTP may be set to be equal to or more than N1. In this case, an evaluation is resumed in step S114. The wording "an evaluation is resumed" means that the evaluator 70 sets an evaluation in an interval in which the TTP is equal to or more than N1 seconds as a target for evaluation. In a case where the first object OB has stopped, the process of step S110 may be omitted.

In a case where the TTP is less than N1 seconds, the first determination processor 64 determines whether N2 seconds (for example, 3 seconds) have elapsed after passage through the first object OB1 (step S112). In a case where N2 seconds has not elapsed, the flow returns to the process of step S110.

In a case where N2 seconds has elapsed, the terminal-side controller 60 resumes an evaluation (step S114). The wording "resuming an evaluation" means that the evaluator 70 sets an interval after N2 seconds has elapsed as a target for evaluation. Thereby, processes of one routine of this flow chart are terminated.

In a case where the first object is a moving object, in step S112, the first determination processor 64 may determine whether a distance from the first object is set to be equal to or more than a predetermined distance.

As described above, the terminal-side controller 60 can perform an evaluation consistent with the realities of traffic conditions by excluding an interval in which it is determined that the degree of approach between the first object OB1 and the host vehicle M in the traveling direction of the vehicle is a first predetermined degree or more from a target for evaluation.

[Second Flow Chart]

Figure 7:
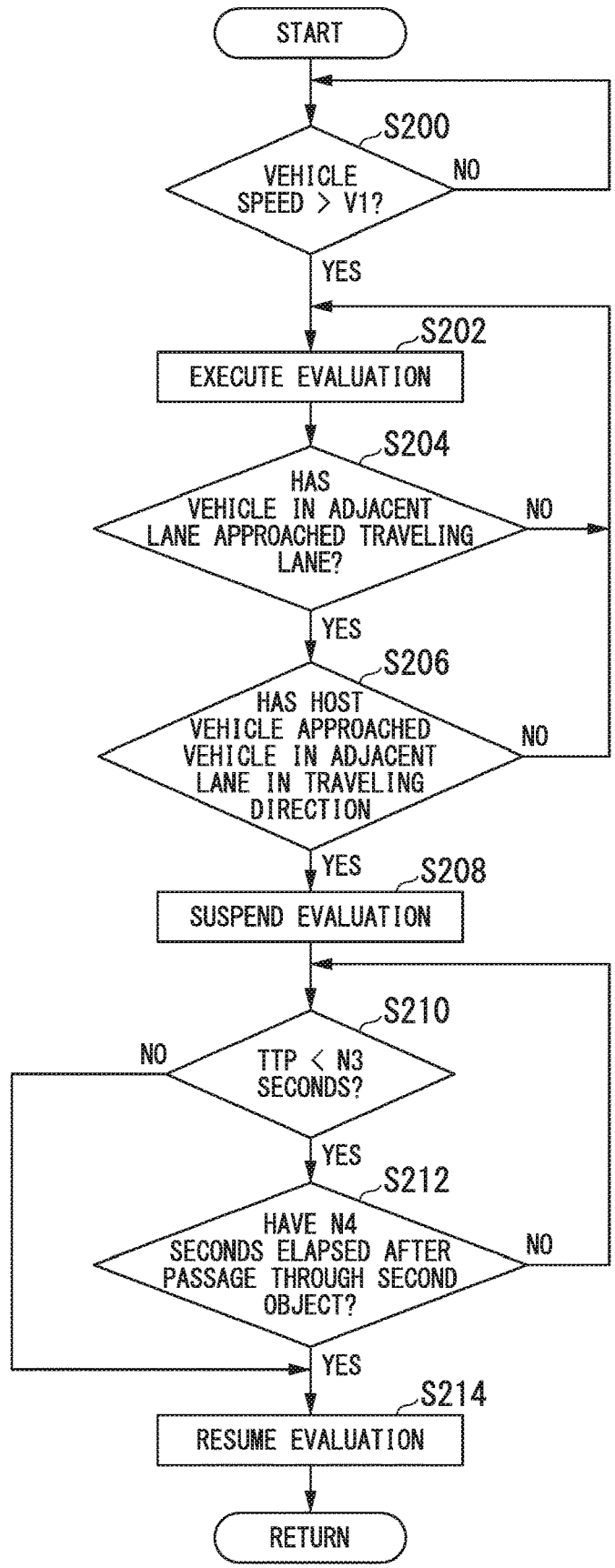
FIG. 7 is a flow chart showing an example of a flow of processes executed centering on a second determination processor.

FIG. 7 is a flow chart showing an example of a flow of processes executed centering on the second determination processor 66. FIG. 7 is a process in which a process executed by the terminal-side controller 60 is performed in real time.

First, the acquirer 62 determines whether the speed of the vehicle exceeds the speed V1 (step S200). In a case where the speed of the vehicle exceeds the speed V1, the terminal-side controller 60 executes an evaluation (step S202).

Next, the second determination processor 66 determines whether a vehicle in an adjacent lane has approached the traveling lane of the host vehicle M (step S204). The term "approached" means that the distance between the vehicle in an adjacent lane and the traveling lane (for example, a road division line on the adjacent lane side) has reached a predetermined distance or less. In a case where the vehicle in an adjacent lane has not approached the traveling lane, the flow returns to the process of step S202.

In a case where the vehicle in an adjacent lane has approached the traveling lane, the second determination processor 66 determines whether the host vehicle has approached the vehicle in an adjacent lane in the traveling direction of the host vehicle M (step S206). In a case where the host vehicle has not approached the vehicle in an adjacent lane (for example, in a case where the TTP between the host vehicle M and the vehicle in an adjacent lane in the traveling direction of the host vehicle M is equal to or more than N3 seconds), the flow returns to the process of step S202.

In a case where the host vehicle has approached the vehicle in an adjacent lane, the evaluator 70 suspends an evaluation (step S208). Next, the second determination processor 66 determines whether the TTP is less than N3 seconds (for example, 3 seconds) (step S210). In a case where the TTP is not less than N3 seconds, the flow proceeds to the process of step S214 described later. For example, in a case where the vehicle in an adjacent lane is moving in the traveling direction of the host vehicle M, the TTP is once set to be less than N3 seconds, and then in case that the vehicle in an adjacent lane accelerates, the TTP may become equal to or more than N3. In this case, an evaluation is resumed in step S214. The wording "an evaluation is resumed" means that the evaluator 70 sets an interval in which the host vehicle M travels as a target for evaluation.

In a case where the TTP is less than N3 seconds, the second determination processor 66 determines whether N4 seconds (for example, 3 seconds) has elapsed after passage through the second object (vehicle in an adjacent lane) (step S212). In a case where N4 seconds has not elapsed, the flow returns to the process of step S210.

In a case where N4 seconds has elapsed, the terminal-side controller 60 resumes an evaluation (step S214). Thereby, processes of one routine of this flow chart are terminated.

After the evaluator 70 suspends an evaluation, the determination process of step S204 may be performed. That is, in a case where the vehicle in an adjacent lane has not approached the traveling lane of the host vehicle M after an evaluation is suspended, an evaluation is resumed. For example, the vehicle in an adjacent lane has approached the traveling lane of the host vehicle M in the process of step S204, but this is because the vehicle in an adjacent lane may be in a state of not approaching the traveling lane of the host vehicle M after an evaluation is suspended. Thereby, an evaluation is appropriately resumed.

As described above, the terminal-side controller 60 can perform an evaluation consistent with the realities of traffic conditions by excluding an interval, in which it is determined that the degree of approach between the second object OB2 present in an adjacent lane adjacent to a lane along which the host vehicle M travels and the host vehicle M in the traveling direction of the host vehicle M is a second predetermined degree or more and the degree of approach between the second object OB2 and the traveling lane along which the host vehicle M travels in a lateral direction is a third predetermined degree or more, from a target for evaluation.

The processes of the flow charts of FIGS. 6 and 7 have been described as separate processes, but these processes may be performed integrally, and may be executed in parallel.

For example, an object may be present in the traveling lane or an adjacent lane, and traveling may be performed so as to avoid the object. However, in a system that evaluates whether to generally travel along the center of a lane, an evaluation may be performed in which traveling along the center of a lane is not performed uniformly without considering the above-described actual traffic conditions. That is, an evaluation according to the realities of traffic conditions is not performed.

On the other hand, the terminal device 50 of the present embodiment excludes an interval (interval in which traveling at a position shifted from the center of a lane, but which can be evaluated to be appropriate traveling) in which an object is present in the traveling lane or an adjacent lane and traveling is performed so as to avoid the object from a target for evaluation. As a result, it is possible to perform an evaluation consistent with the realities of traffic conditions.

In the above-described embodiment, a description has been given in which the terminal-side controller 60 is implemented by the driving evaluation application 82 being executed, but there is no limitation thereto. For example, some of the functional units of the terminal-side controller 60 may be implemented by a hardware processor such as, for example, a central processing unit (CPU) executing a program (software). Some or all of these components may be implemented by hardware (circuit unit; including circuitry) such as a large scale integration (LSI), an application specific integrated circuit (ASIC), a field-programmable gate array (FPGA), or a graphics processing unit (GPU), and may be implemented by cooperation between software and hardware.

Some or all of instruments or functional units included in the terminal device 50 may be included in the vehicle system 10. On the contrary, some or all of instruments or functional units included in the vehicle system 10 may be included in the terminal device 50 as shown in FIG. 8.

Figure 8:
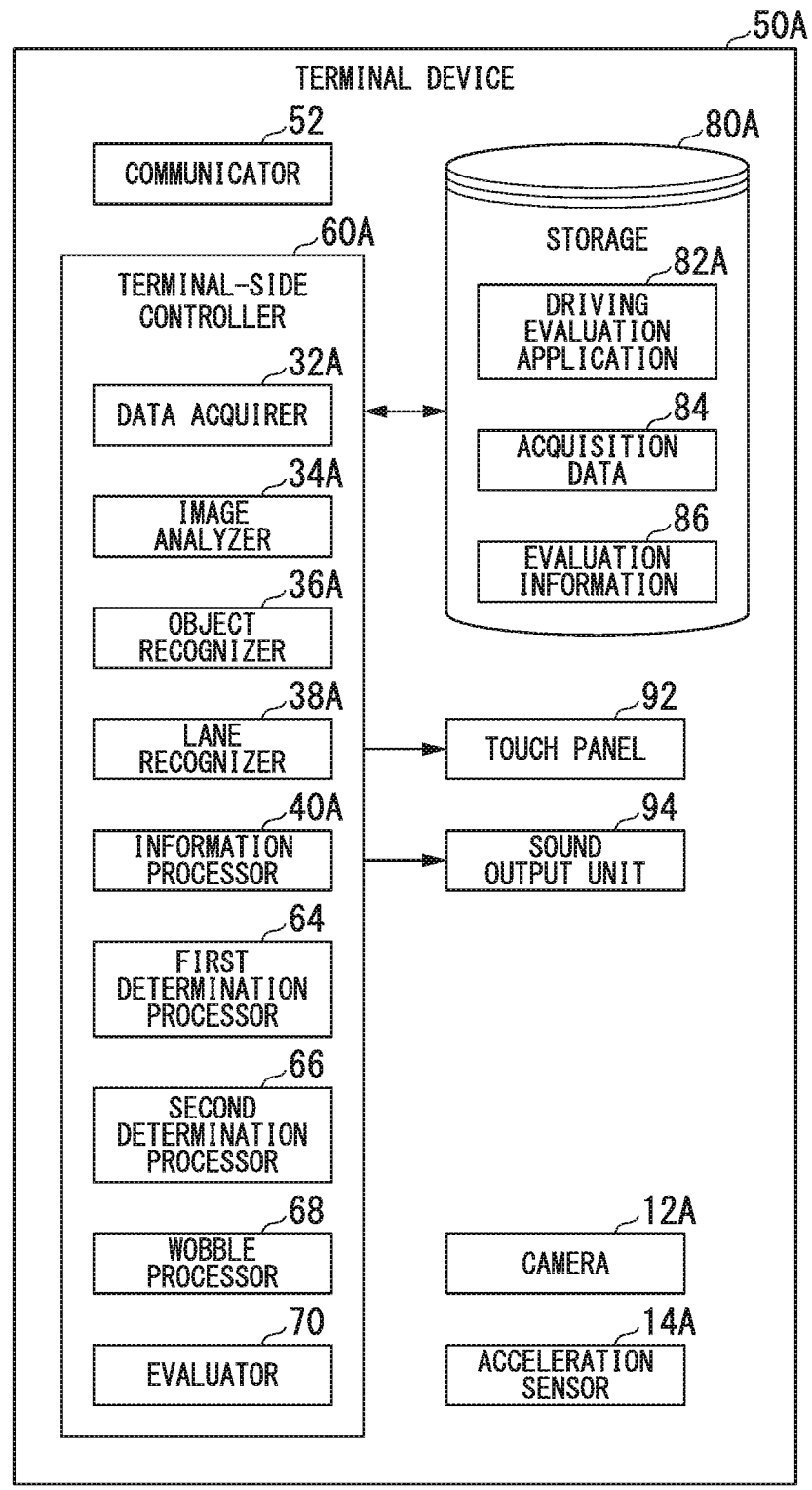
FIG. 8 is a diagram showing an example of a functional configuration of a terminal device.

FIG. 8 is a diagram showing an example of a functional configuration of a terminal device 50A. The terminal device 50A includes, for example, a camera 12A and an acceleration sensor 14A in addition to the functional configuration of the terminal device 50. The camera 12A has the same function as that of the camera 12. The acceleration sensor 14A derives acceleration.

The terminal device 50A includes a terminal-side controller 60A instead of the terminal-side controller 60. The terminal-side controller 60A includes a data acquirer 32A, an image analyzer 34A, an object recognizer 36A, a lane recognizer 38A, and an information processor 40A in addition to the functional configuration of the terminal-side controller 60. The data acquirer 32A, the image analyzer 34A, the object recognizer 36A, the lane recognizer 38A, and the information processor 40A have the same functions as those of the data acquirer 32, the image analyzer 34, the object recognizer 36, the lane recognizer 38, and the information processor 40, respectively. The information processor 40A derives a speed on the basis of the detection result of the acceleration sensor 14A.

The terminal device 50A includes a storage 80A instead of the storage 80. A driving evaluation application 82A is stored in the storage 80A instead of the driving evaluation application 82. The terminal-side controller 60A is implemented by the driving evaluation application 82A being executed using a processor such as the CPU of the terminal device 50. The data acquirer 32A, the image analyzer 34A, the object recognizer 36A, the lane recognizer 38A, and the information processor 40A are implemented by the driving evaluation application 82A being executed by a processor.

The terminal device 50A is fixed to, for example, a stand or the like provided on the upper surface of the instrument panel of a vehicle. Specifically, the terminal device 50A is installed at a position at which a forward image of the vehicle can be captured by the camera 12A in a state where the driving evaluation application 82A is executed. The terminal device 50A executes an evaluation process on the basis of an image captured by the camera 12A.

According to the embodiments described above, it is possible to perform an evaluation consistent with the realities of traffic conditions by including the approach determiner (the first determination processor 64 or the second determination processor 66) that determines whether the degree of approach between an object present in the periphery of a vehicle and the vehicle is a predetermined degree or more, the acquirer 62 that acquires a relative position of the host vehicle M with respect to the traveling lane along which the host vehicle M travels, and the evaluator 70 that refers to the relative position acquired by the acquirer 62 and thereby evaluate a driver's skill in driving as higher as the vehicle travels at a position closer to the center of the traveling lane, the evaluator excluding an interval in which it is determined by the approach determiner that the degree of approach is a predetermined degree or more from a target for evaluation.

[Hardware Configuration]

Figure 9:
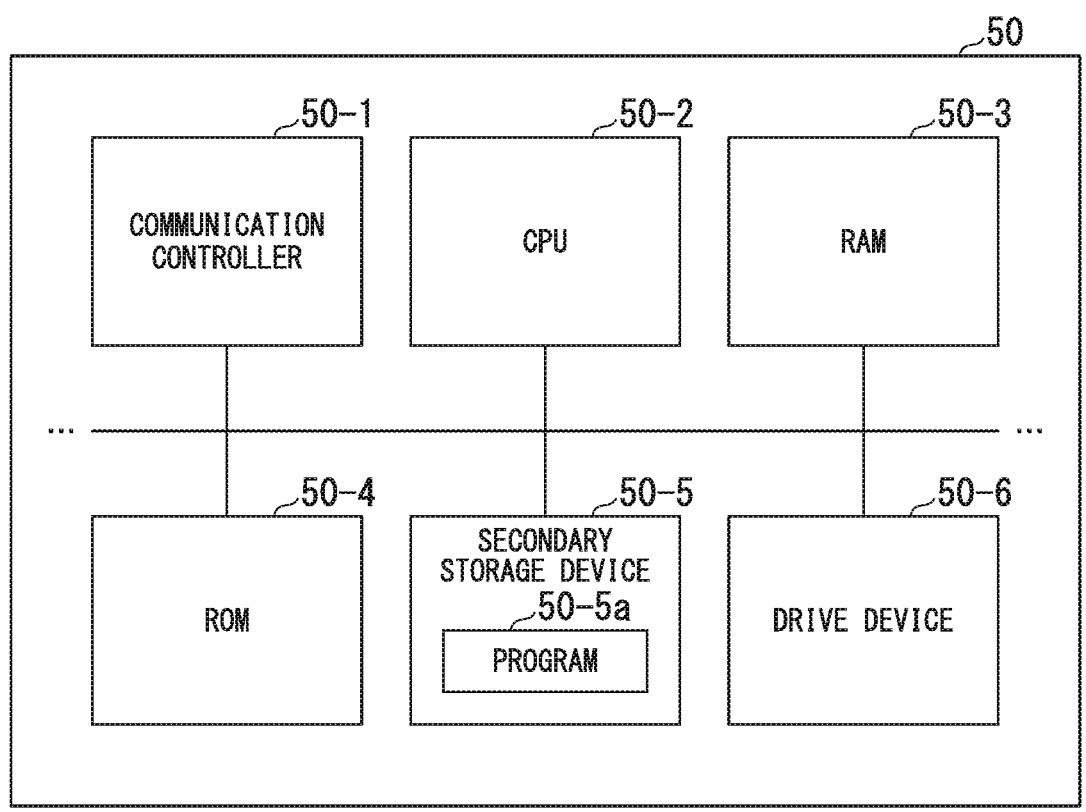
FIG. 9 is a diagram showing an example of a hardware configuration of a terminal device of an embodiment.

The terminal device 50 of the above-described embodiment is implemented by, for example, the hardware configuration as shown in FIG. 9. FIG. 9 is a diagram showing an example of a hardware configuration of the terminal device 50 of an embodiment.

The terminal device 50 is configured such that a communication controller 50-1, a CPU 50-2, a RAM 50-3, a ROM 50-4, a secondary storage device 50-5 such as a flash memory or an HDD, and a drive device 50-6 are connected to each other through an internal bus or a dedicated communication line. The drive device 50-6 has a portable storage medium such as an optical disc mounted thereon. A program 50-5a stored in the secondary storage device 50-5 is developed into the RAM 50-3 by a DMA controller (not shown) or the like and is executed by the CPU 50-2, whereby the terminal-side controller 60 is implemented. The program (for example, the driving evaluation application 82) which is referred to by the CPU 50-2 may be stored in a portable storage medium mounted in the drive device 50-6, and may be downloaded from other devices through a network NW.

The above embodiment can be represented as follows.

A driving evaluation system including:

a storage device; and a hardware processor configured to execute a program stored in the storage device, wherein the hardware processor is configured to execute the program to, determine whether a degree of approach between an object present in a periphery of a vehicle and the vehicle is a predetermined degree or more, acquire a relative position of the vehicle with respect to a traveling lane along which the vehicle travels, refer to the acquired relative position and thereby evaluate a driver's skill in driving as higher as the vehicle travels at a position closer to a center of the traveling lane, and exclude an interval in which it is determined that the degree of approach is a predetermined degree or more from a target for evaluation.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving evaluation system comprising:
a memory configured to store instructions;
an output device configured to output a sound or an image; and
one or more processors configured to execute the instructions to:
determine whether a first degree of approach between first object present in a periphery of a vehicle and the vehicle is a first predetermined degree or more;
acquire a relative position of the vehicle with respect to a traveling lane along which the vehicle travels;
based on the relative position:
evaluate a driver's skill in driving the vehicle as higher, when the vehicle travels at a position closer to a center of the traveling lane and the first degree of approach is lower than the first predetermined degree,
evaluate the driver's skill as higher when the vehicle travels away from the first object, and
evaluate the driver's skill as lower when the vehicle travels at a position closer to a center of the traveling lane and the first degree of approach is the first predetermined degree or more; and
outputting, by the output device, the sound or the image corresponding to the driver's skill, to provide an evaluation of the driver's skill.

2. The driving evaluation system according to claim 1, wherein the instructions further comprise instructions to:
determine whether a second degree of approach between a first object present in the traveling lane along which the vehicle travels and the vehicle in a traveling direction of the vehicle is a second predetermined degree or more, and
evaluate the driver's skill as higher when the vehicle travels away from the first object, and
evaluate the driver's skill as lower when the vehicle travels at the position closer to the center of the traveling lane and the first degree of approach between the first object and the vehicle is the first predetermined degree or more from a target.

3. The driving evaluation system according to claim 2, wherein the first object is present in the traveling lane, and is one or both of an object of which a speed is lower than a speed of the vehicle by a predetermined speed or more and an object having a predetermined width or less with respect to a width of the traveling lane.

4. The driving evaluation system according to claim 2, wherein the instructions further comprise instructions to:
detect the first object present in the traveling direction of the vehicle in the traveling lane along which the vehicle travels.

5. The driving evaluation system according to claim 1, wherein the instructions further comprise instructions to:
determine whether a second degree of approach between a second object present in an adjacent lane adjacent to a lane along which the vehicle travels and the vehicle in a traveling direction of the vehicle is a second predetermined degree or more, and determine whether a third degree of approach between the second object and the traveling lane along which the vehicle travels in a lateral direction is a third predetermined degree or more,
evaluate the driver's skill as higher when the vehicle travels away from the second object, and
evaluate a driver's skill as lower when the vehicle travels at the position closer to the center of the traveling lane when the second degree of approach between the second object and the vehicle is the second predetermined degree or more, and the third degree of approach between the second object and the traveling lane is the third predetermined degree or more.

6. The driving evaluation system according to claim 5, wherein the instructions further comprise instructions to detect the second object present in the adjacent lane.

7. The driving evaluation system according to claim 1, wherein the instructions further comprise instructions to set an interval in which it is determined that the first degree of approach is less than the first predetermined degree as the target for evaluation.

8. The driving evaluation system according to claim 1, wherein the instructions further comprise instructions to determine whether a first degree of approach between the first object and the vehicle is the predetermined degree or more using an index based on a distance between the first object and the vehicle in a traveling direction and a relative speed between the first object and the vehicle.

9. The driving evaluation system according to claim 1, wherein the instructions further comprise instructions to refer to the relative position in real time and thereby evaluate a driver's skill as higher when the vehicle travels at the position closer to the center of the traveling lane, and
interrupt the evaluation when it is determined that the degree of approach is a predetermined degree or more.

10. The driving evaluation system according to claim 9, wherein the instructions further comprise instructions to resume the evaluation when it is determined that the first degree of approach is less than the first predetermined degree.

11. A non-transitory computer-readable storage medium causing a computer to:
determine whether a first degree of approach between first object present in a periphery of a vehicle and the vehicle is a first predetermined degree or more;
acquire a relative position of the vehicle with respect to a traveling lane along which the vehicle travels;
based on the relative position:
evaluate a driver's skill in driving the vehicle as higher, when the vehicle travels at a position closer to a center of the traveling lane and the first degree of approach is lower than the first predetermined degree,
evaluate the driver's skill as higher when the vehicle travels away from the first object, and
evaluate the driver's skill as lower when the vehicle travels at a position closer to a center of the traveling lane and the first degree of approach is the first predetermined degree or more; and
output a sound or an image corresponding to the driver's skill.

12. The driving evaluation system according to claim 1, wherein the instructions further comprise instructions to:
communicate with the vehicle to acquire information for evaluating the driver's skill based on the information provided by the vehicle.

13. A driving evaluation system comprising:
a memory configured to store instructions; and
one or more processors configured to execute the instructions to:
determine whether a first degree of approach between a first object present in a periphery of a vehicle and the vehicle is a first predetermined degree or more,
acquire a relative position of the vehicle with respect to a traveling lane along which the vehicle travel, refer to the relative position acquired and thereby evaluate a driver's skill in driving the vehicle as higher as the vehicle travels at a position closer to a center of the traveling lane when the first degree of approach is lower than the first predetermined degree or more, determine whether a second degree of approach between a second object present in the traveling lane is a second predetermined degree or more, exclude an interval in which it is determined that the second degree of approach is the second predetermined degree or more from a target for evaluation, resume evaluating the driver's skill in a case where a predetermined time has elapsed after the vehicle passes the first object, and provide information of the driver's skill by employing an output device to output a sound or an image.

14. The driving evaluation system of claim 13, wherein the instructions further comprise instructions to:

determine for a reference vehicle, conditions that:
   (a) the reference vehicle is present and travelling along a lane adjacent to the travelling lane,
   (b) a third degree of approach between the reference vehicle and the vehicle is a third reference degree or more, and
   (c) a fourth degree of approach between the reference vehicle and the first lane in a lateral direction is a fourth reference degree or more;

stop evaluating the driver's skill when conditions (a), (b) and (c) are satisfied; and continue to evaluate driver's skill when conditions (a), (b) or (c) are not satisfied.

\* \* \* \* \*